3,830,881
VULCANIZATES OF EPDM AND DIENE RUBBER BLENDS
Martin E. Woods, Rocky River, and Thomas R. Mass, Avon Lake, Ohio, assignors to The B. F. Goodrich Company, New York, N.Y.
No Drawing. Filed Feb. 26, 1973, Ser. No. 335,885
Int. Cl. C08c *11/58;* C08d *9/08*
U.S. Cl. 260—889                                    10 Claims

ABSTRACT OF THE DISCLOSURE

Polymer blends of ethylene-higher α-olefin-polyene (EPDM) polymers with highly unsaturated diene rubbers are cured using sulfur and a symmetrical metal dithiocarbamate as a vulcanization accelerator. The vulcanizates exhibit improved stress-strain, flex-heat buildup, and oil swell properties.

BACKGROUND OF THE INVENTION

Ethylene-higher α-olefin-polyene (EPDM) polymers are known for their excellent vulcanizate properties of oxygen and ozone resistance, weatherability, and heat and chemical resistance. Unfortunately, the polymers lack building tack, oil resistance, hot tear resistance, and high internal strength. The disadvantages prohibit the use of EPDM polymers in applications such as tires and automotive and industrial hosing. These applications have been dominated by high unsaturation diene rubbers such as natural rubber, styrene-butadiene rubbers, and polychloroprene. The diene rubbers have disadvantages in their lack of oxygen and ozone resistance, heat resistance, and weatherability. A practical solution to both problems would be to physically blend the two types of polymers, cure the blend, and obtain a vulcanizate having the desirable properties of each type of polymer.

One serious problem though is cure incompatibility, or the inability of a cure system to sufficiently cure each type of polymer in the polymer blend, and to sufficiently covulcanize the types of polymers in the blend. The cure incompatibility is demonstrated by the failure of the vulcanizate to perform at a level predicted from a consideration of the ratios of the polymers in the blend. Often the performance will be much less than predicted, and even worse than the performance of either polymer alone. Poor co-vulcanization is readily apparent in the stress-strain (tensile, elongation) properties, flex-heat buildup, and oil swell properties.

A major factor in cure incompatibility is the preference commonly known vulcanization accelerators show for one polymer over another, leading to over-cure of one polymer, and under-cure of the other polymer.

SUMMARY OF THE INVENTION

Compositions comprising an ethylene-higher α-olefin-polyene (EPDM) polymer, a highly unsaturated diene rubber, and a symmetrical metal dithiocarbamate of the formula

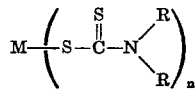

as a vulcanization accelerator are cured using sulfur or a sulfur-donor to yield vulcanizates having improved tensile and elongation, flex-heat buildup, and oil swell.

DETAILED DESCRIPTION

The ethylene-higher α-olefin-polyene (EPDM) polymers employed have an ethylene content of from about 10% to about 90% by weight, a higher α-olefin content of about 10% to about 80% by weight, and a polyene content of about 0.5% to about 20% by weight, all weights based on the total weight of the polymer. The higher α-olefin contains 3 to about 14 carbon atoms. Examples of these are propylene, isobutylene, 1-butene, 1-pentene, 1-octene, 2-ethyl-1-hexene, 1-dodecene, and the like. More preferredly, the higher α-olefin contains 3 to about 6 carbon atoms. The polyene can be a conjugated diene such as isoprene, butadiene, chloroprene, and the like; a nonconjugated diene; a triene, or a higher enumerated polyene. Examples of trienes are 1,4,9-decatriene, 5,8-dimethyl-1,4,9-decatriene, 4,9-dimethyl-1,4,9 - decatriene, and the like. The nonconjugated dienes containing from 5 to about 25 carbon atoms are more preferred. Examples of the nonconjugated dienes are nonconjugated diolefins such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclonondienes such as 3-methylbicyclo(4,2,1)nona-3,7-diene, 3-ethylbicyclonondiene, and the like; indenes such as methyl tetrahydroindene and the like; alkenyl norbornenes such as 5-ethylidene-2-norbornene, 5-butylidene-2-norbornene, 2 - methallyl-5-norbornene, 2-isopropenyl-5-norbornene, 5 - (1,5-hexadienyl)-2-norbornene, 5-(3,7 - octadienyl) - 2 - norbornene, and the like; and tricyclo dienes such as 3-methyl-tricyclo(5,2,1,0$^{2,6}$)-3,8-decadiene and the like.

Preferredly, the EPDM polymers contain from about 20% to about 80% by weight of ethylene, about 19% to about 70% by weight of a higher α-olefin, and about 1% to about 10% by weight of a nonconjugated diene. The more preferred higher α-olefins are propylene and 1-butene. The more preferred nonconjugated dienes are the ethylenically unsaturated bridged ring compounds containing two double bonds, one of which at least is in a ring, such as the alkenyl norbornenes and the cyclic dienes.

More preferredly, the EPDM polymers have an ethylene content of from about 50% to about 70% by weight, a propylene content of from about 20% to about 49% by weight, and a nonconjugated diene content from about 1% to about 10% by weight, all weights based upon the total weight of the polymer.

The EPDM polymers have molecular weights from about 20,000 to about 2,000,000 or more. Their physical form varies from waxy materials to rubbers to hard plastic-like polymers. They have dilute solution viscosities (DSV) from about 0.5 to about 10, measured at 30° C. on a solution of 0.1 gram of polymer in 100 cc. of toluene.

The highly unsaturated diene rubbers have an olefinic (>C=C<) content from about 20% to about 45% by weight based upon the total weight of the polymer.

The rubbers usually contain at least 50% and up to 100% by weight of a conjugated diene monomer containing 4 to about 8 carbon atoms, and up to about 50% by weight of copolymerizable vinylidene monomers having a terminal vinylidene ($CH_2=C<$) group. Examples of the conjugated diene monomers are butadiene, isoprene, chloroprene, 2-isopropyl-1,3-butadiene, 1,3-pentadiene, and the like. More preferred are the conjugated dienes containing 4 to about 6 carbon atoms such as butadiene, chloroprene, and isoprene.

Examples of copolymerizable vinylidene monomers containing a terminal vinylidene group are (a) monoolefins containing 2 to about 8 carbon atoms; (b) vinyl aromatics such as styrene, α-methyl styrene, chlorostyrene, vinyl toluene, and the like; (c) vinyl nitriles such as acrylonitrile, methacrylonitrile, and the like; (d) vinyl and allyl esters such as vinyl acetate, vinyl propionate, allyl acetate, and the like; (e) vinyl and allyl ethers such as vinyl methyl ether, allyl methyl ether, and the like; (f) divinyls and diacrylates such as divinyl benzene, divinyl ether, diethylene glycol diacrylate, and the like; and (g) acrylates of the formula

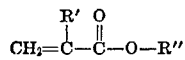

wherein R' is —H, —CH₃ or —C₂H₅, and R'' is an alkyl radical containing 1 to 18 carbon atoms or an alkoxyalkyl, an alkylthioalkyl, or cyanoalkyl radical containing 2 to about 12 carbon atoms. Examples of such acrylates are ethyl acrylate, butyl acrylate, octadecyl acrylate, methoxyethyl acrylate, butoxyethyl acrylate, hexylthioethyl acrylate, β-cyanoethyl acrylate, cyanooctyl acrylate, methyl methacrylate, octyl methacrylate, ethyl ethacrylate, and the like.

The diene rubbers include natural rubber, the general purpose synthetic rubbers, and specialty rubbers. Examples of these rubbers are natural rubber, polyisoprenes, polybutadienes, poly(butadiene-styrene) rubbers, poly(isoprene-styrene) rubbers, polychloroprenes, poly(butadiene-acrylonitrile) rubbers, poly (isoprene-acrylonitrile) rubbers, polypentenamer rubbers, and the like. The rubbers have molecular weights and DSV values similar to those of the EPDM polymers.

The EPDM polymer and diene rubber can be blended together in any ratio of one polymer to the other. The weight percent of EPDM polymer in the blend can be from about 1% to about 99%. More often, the weight percent of EPDM will be from about 10% to about 95% by weight of the blend. The greatest improvement in vulcanizate properties is demonstrated in blends containing from about 25% to about 90% by weight of EPDM polymer based upon the weight of the blend.

More than one EPDM polymer can be employed in the blend. Similarly, more than one diene rubber can be employed. Therefore, though many blends will contain only two polymers, over two and up to 4 or more polymers can be present in a blend. In such a case, the EPDM polymers are treated as a group, and the diene rubbers treated as a group, for purposes of determining the weight percents of the polymers in the blend. For example, a blend containing 30% by weight of a polymer of ethylene-propylene-dicyclopentadiene, 50% by weight of polyisoprene, and 20% by weight of poly(butadiene-styrene) would contain 30% by weight of EPDM and 70% by weight of diene rubber for the purposes of this invention.

The polymer blend is cured using sulfur or a sulfur-donor and a symmetrical metal dithiocarbamate as a vulcanization accelerator. The sulfur or sulfur-donor is used in a range from about 0.5 to about 10 parts by weight based upon 100 parts by weight of the polymer blend. More preferredly, the range is from about 1 part to about 5 parts by weight. Examples of sulfur-donors are tetramethylthiuram disulfide, tetraethylthiuram disulfide, dipentamethylenethiuram hexasulfide, and the like.

The symmetrical metal dithiocarbamates are used in a range from about 0.1 to about 10 parts by weight based upon the weight of the polymer blend, and more preferably from about 0.5 to about 5 parts by weight. The compounds have the formula

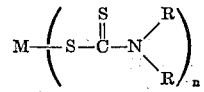

where M is a metal, $n$ is the valency of the metal, and R is a hydrocarbon radical containing 6 to about 24 carbon atoms and both R groups are the same, i.e., symmetrical. M can be silver, copper, sodium, magnesium, bismuth, zinc, cobalt, nickel, cadmium, lead, iron, selenium, tellurium, or tin. The value of $n$ is from 1 to 4. More preferably, M is selected from zinc, cadmium, and lead, and $n$ is 2. The hydrocarbon radical can be alkyl radicals or aralkyl radicals, alkaryl radicals, or cycloalkyl radicals which furthermore can be substituted with lower alkyl groups. The alkyl radicals can be linear or branched, and can contain primary, secondary, or tertiary carbon structures.

Examples of the compounds are zinc di(dihexyldithiocarbamate),
cadmium di(dioctyldithiocarbamate),
zinc di(di-2-ethylhexyldithiocarbamate),
nickel di(didecyldithiocarbamate),
zinc di(didecyldithiocarbamate),
zinc di(didodecyldithiocarbamate),
cadmium di(ditetradecyldithiocarbamate),
nickel di(dipentadecyldithiocarbamate),
zinc di(dieicosyldithiocarbamate),
cadmium di(di-nonylphenyldithiocarbamate),
nickel di(dibenzyldithiocarbamate),
zinc di(di-3,5-dioctylcyclohexyldithiocarbamate), and the like.

More preferably, R is an alkyl radical containing at least 8 and up to about 24 carbon atoms. Examples of the more preferred compounds are zinc di(di-2-ethylhexyldithiocarbamate),
nickel di(didecyldithiocarbamate),
cadmium di(didodecyldithiocarbamate),
zinc di(didodecyldithiocarbamate),
cadmium di(ditetradecyldithiocarbamate),
zinc di(dioctadecyldithiocarbamate),
cadmium di(dieicosyldithiocarbamate),
zinc di(dieicosyldithiocarbamate),
zinc di(didocosyldithiocarbamate), and the like.

The EPDM polymer, the diene rubber, the sulfur and the dithiocarbamate compound are admixed using standard mixing techniques. The mixing equipment can be Banburys, extruders, two-roll mills and like equipment. The ingredients are mixed at a temperature and for a time to obtain uniform mixing. Vulcanization temperatures range from about 250° F. to about 400° F., and times ranging from about 10 minutes to about 60 minutes or more.

Many other compounding ingredients may be used along with the sulfur or sulfur-donor and the symmetrical dithiocarbamate compound. Such ingredients include activators such as zinc, calcium, and magnesium oxide, lead monoxide and dioxide, fatty acids such as stearic and lauric acid, and salts thereof such as cadmium, zinc and copper stearate and lead oleate; fillers such as channel blacks, reinforcing blacks, and thermal blacks, calcium and magnesium carbonate, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like, ASTM type 2 petroleum oils, ASTM D2226 aromatic, naphthalenic and paraffinic oils, castor oil, tall oil, glycerin, and the like; antioxidants, antiozonants, and stabilizers such as N,N'-di-β-naphthyl-p-phenylenediamine,
N-phenyl-β-naphthylamine,
N,N'-dioctyl-p-phenylenediamine,
N-1,3-dimethylbutyl-N'-phenyl-p-phenylenediamine,
4-isopropylamino diphenylamine,
2,6-di-t-butyl paracresol,
2,2'-methylenebis-(4-ethyl-6-t-butyl phenol),
2,2'-thiobis-(4-methyl-6-t-butyl phenol),
bisphenol-2,2'-methylene-bis-6-t-butyl-4-ethylphenol,
4,4'-butylidenebis-(6-t-butyl-m-cresol),
2-(4-hydroxy-3,5-t-butylaniline)-4,6-bis(octylthio)-1,3,5-triazine,
hexahydro-1,3,5-tris-β-(3,5-di-t-butyl-4-hydroxyphenyl) propionyl-s-triazine,
tris-(3,5-di-t-butyl-4-hydroxybenzyl)isocyanurate,
tetrakismethylene-3(3',5'-di-t-butyl-4'-hydroxyphenyl) propionate methane,
distearyl thiodipropionate,
dilauryl thiodipropionate,
tri(nonylatedphenyl) phosphite, and the like; and other ingredients such as pigments, tackifiers, flame retardants, fungicides, and the like.

Although the disclosure is directed to blends of EPDM polymers with diene rubbers, the disclosed metal dithiocarbamates can be effectively used in blends of diene rubbers with other low unsaturation polymers. These low unsaturation polymers are interpolymers of from about 0.5% to about 20% by weight of a diolefin and from about 80% to about 99.5% by weight of a vinyl monomer containing a terminal vinylidene ($CH_2=C<$) group. The diolefin can be either a conjugated diene containing 4 to 10 carbon atoms such as butadiene, isoprene, chloroprene, 2-isopropyl-1,3-butadiene, 1,3-pentadiene, 2,4-octadiene, and the like, or a nonconjugated diene as previously defined Examples of the vinylidene monomers are (1) monoolefins containing 2 to about 14 carbon atoms such as ethylene and the higher α-olefins previously mentioned, (2) vinyl aromatics such as styrene and α-methyl styrene, (3) vinyl and allyl esters such as vinyl acetate, vinyl propionate, and allyl acetate, (4) vinyl and allyl ethers such as vinyl methyl ether and allyl methyl ether, and (5) acrylates of the formula

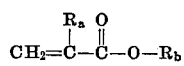

where $R_a$ is —H, —$CH_3$, or —$C_2H_5$ and $R_b$ is an alkyl radical containing 1 to about 18 carbon atoms or an alkoxyalkyl, an alkylthioalkyl or cyanoalkyl radical containing 2 to about 12 carbon atoms. Examples of acrylates are ethyl acrylate, butyl acrylate, 2-ethylhexyl acrylate, dodecyl acrylate, methoxyethyl acrylate, ethoxyethyl acrylate, hexyl thioethyl acrylate, β-cyanoethyl acrylate, methyl methacrylate, and ethyl ethacrylate. Examples of such polymers are butyl rubbers prepared by the interpolymerization of isobutylene and isoprene, polymers prepared by the interpolymerization of the diolefin monomers with lower (1-8 carbon) alkyl acrylate monomers such as ethyl acrylate, n-butyl acrylate and 2-ethylhexyl acrylate and polymers prepared by the interpolymerization of the olefin monomers with vinyl ketones, vinyl esters, or vinyl ethers. The weight percent range of these low unsaturation polymers employed in the blend with the diene rubbers is similar to that of the EPDM polymer. The level of sulfur and dithiocarbamate accelerator employed in these polymer blends are also similar.

A composition of (1) an EPDM polymers, (2) a highly unsaturated diene rubber, (3) sulfur or a sulfur-donor and (4) a symmetrical metal dithiocarbamate only as the accelerator, cures readily to yield vulcanizates having improved tensile strength, elongation, flex-crack resistance, ozone and oxygen resistance, heat resistance, and oil resistance (if blended with an oil resistant diene) over that of similar polymer blends cured using commonly known accelerators. It is quite surprising and unexpected that the symmetrical dithiocarbamates yielded vulcanizates having properties notably superior to the properties obtained using unsymmetrical compounds similar to those disclosed in U.S. Pat. 3,678,135.

The composition vulcanizates are useful in applications requiring resistance to heat, oxygen, ozone, chemicals, oil, and flex-cracking. The vulcanizates are of particular use in automotive applications such as tires, hosing, belting, gaskets, seals, weatherstripping, and windshield wiper blades.

The vulcanizates were evaluated as to tensile and elongation following ASTM D412, hardness following ASTM D2240, durometer A, oil swell at 70 hours, at 100° C., following ASTM D471, and flex heat buildup following the procedure ASTM D623 (B.F.G. Flexometer at a 55# load at 50° C. and 17.5%). The Flexometer test employs a 0.5 inch diameter, 1.0 inch high cylinder of the vulcanized polymer blend. The cylinder is subjected to cyclic compressions of a given percent, at a given load and temperature. After a pre-determined time, the temperature of the cylinder is recorded. The results are given as the temperature rise during the test, or ΔT. Good co-vulcanization is shown by a ΔT value for the polymer blend close to that of either polymer alone.

Tensile products were determined. The tensile product is the product of tensile times elongation, and approximates the area under the stress-strain curve. This value is related to the work per unit volume expended. The higher the value, the stronger the cure. The tensile product value is most valuable in comparing the cure state of polymers when all other factors are controlled. The values obtained herein are used to compare the cured strength of the polymer blends when varying only the type of accelerator used.

The following examples serve to more fully illustrate the invention. Ingredients are given in parts by weight unless otherwise specified. The metal dithiocarbamate compounds are used on an equal mole basis in the Examples.

The mix procedure used in all of the examples was as follows: The two polymers (or more) were put into a Banbury mixer and mixed for two minutes. The carbon black, zinc oxide, and stearic acid were then added and the blend mixture mixed for 3 additional minutes. Total Banbury mixing time was 5 minutes. Temperature of the blend after 5 minutes was about 260° F. ±20°. The blend mixture was then removed from the Banbury and placed on a two-roll mill where sulfur and the dithiocarbamate compound were added. Cure times for the blends were determined using a Monsanto Rheometer.

EXAMPLE I

Symmetrical metal dithiocarbamate compounds were prepared using the following general procedure. A secondary amine was dissolved in water or a lower alkyl alcohol such as methanol. A base and carbon disulfide were then added followed by an inorganic metal salt. The solution was agitated and mild heating used during the reaction. The compound was recovered by filtration or by evaporation of the reaction solution to dryness. The dithiocarbamate product was purified by washing with water and/or methanol, or by dissolving the product in acetone, filtering of the solids, and drying to isolate the solid compound. The compounds were analyzed by infra-red spectroscopy and by X-ray fluorescence, and proven to be the desired structure. The purity of the compounds is comparable with that of commercially available vulcanization accelerators.

The base employed is an inorganic base such as sodium or potassium hydroxide, or a metal alcoholate such as sodium methoxide or potassium butoxide. The secondary amine and the base are used in a slight molar excess over the moles of carbon disulfide used. The inorganic metal salt is used in about a 1:1 mole ratio of metal salt to carbon disulfide.

(A) Zinc di(di-2-ethylhexyl)dithiocarbamate was prepared. 100 grams of di-2-ethylhexyl amine was dissolved in 530 milliliters of methanol, and 22.4 grams of sodium methoxide added. 30.6 grams of carbon disulfide was then added over 15 minutes time with stirring. Temperature was about 30° C. This was followed by the addition of 113.2 grams of a solution of 25% by weight zinc chloride in methanol. The solution was stirred and the product formed as a dense liquid. The supernatant liquid was removed and the product washed with water followed by a methanol wash. The compound was further purified by dissolving it in acetone, filtering out insolubles, and evaporating off the residual acetone. The compound is a liquid.

(B) Zinc di(didecyl)dithiocarbamate was prepared following the procedure given in (A) above. The compound is a low melting point solid. Yield was 92% by weight based upon the carbon disulfide used.

(C) Zinc di(didodecyl)dithiocarbamate was prepared following the procedure in (A). The reaction temperature was 45° C. The compound is a low melting point solid. Yield was 81% by weight.

(D) Zinc di(dieicosyl)dithiocarbamate was prepared following the procedure given in (A). Isopropyl alcohol was used as the solvent and the reaction temperature was 75° C. The compound, a solid, was obtained in a 92% by weight yield.

(E) An unsymmetrical dithiocarbamate was prepared following the procedure given in (A). N-methyl-N-octadecyl amine was employed as the secondary amine. The reaction temperature was 45° C. The compound, zinc di(methyloctadecyl)dithiocarbamate, is a solid. Percent yield was 82% by weight.

Use of other symmetrical secondary amines results in the preparation of numerous other symmetrical zinc dithiocarbamates. Use of other unsymmetrical secondary amines results in the preparation of numerous other unsymmetrical zinc dithiocarbamates. Substitution of other inorganic metal salts such as cadmium, nickel, selenium, tellurium, tin, and lead salts results in the preparation of the respective metal dithiocarbamate.

EXAMPLE II

Polymer blends were prepared containing EPDM polymer and SBR 1502 rubber. The EPDM polymer has a composition of about 58 percent by weight of ethylene, about 33 percent by weight of propylene, and about 9 percent by weight of ethylidene-2-norbornene, and a raw polymer Mooney value (ML–4 at 212° F.) of about 50. The SBR 1502 rubber is a poly(butadienestyrene) rubber having a 23.5 percent by weight styrene content and a Mooney value of about 50. The two polymers were blended and portions cured using a symmetrical metal dithiocarbamate prepared in Example I. As comparisons, EPDM/SBR blends were cured using (a) a well-known commercial metal dithiocarbamate and (b) the unsymmetrical metal dithiocarbamate prepared in Example I. The recipes used (in parts by weight) and the data obtained are as follows:

|  | 1 | 2 | 3 | 4 | 5 | 6 | 7 | 8 | 9 |
|---|---|---|---|---|---|---|---|---|---|
| EPDM | 100 | 50 |  | 100 | 50 |  | 100 | 50 |  |
| SBR |  | 50 | 100 |  | 50 | 100 |  | 50 | 100 |
| N550 | 55 | 55 | 55 | 55 | 55 | 55 | 55 | 55 | 55 |
| Zinc oxide | 5 | 5 | 5 | 5 | 5 | 5 | 5 | 5 | 5 |
| Stearic acid | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 |
| $C_2$[1] | 0.6 | 0.6 | 0.6 |  |  |  |  |  |  |
| $C_{10}$[2] |  |  |  | 1.3 | 1.3 | 1.3 |  |  |  |
| $C_1, C_{18}$[3] |  |  |  |  |  |  | 1.3 | 1.3 | 1.3 |
| Cured 20 minutes at 320° F.: |  |  |  |  |  |  |  |  |  |
| Tensile, p.s.i. | 2,975 | 2,275 | 2,975 | 2,925 | 2,800 | 2,950 | 2,700 | 2,000 | 2,980 |
| 100% modulus, p.s.i. | 1,075 | 870 | 610 | 1,000 | 800 | 400 | 975 | 780 | 500 |
| Elongation, percent | 250 | 260 | 380 | 250 | 310 | 500 | 220 | 210 | 380 |
| Hardness, Durometer A | 77 | 75 | 71 | 73 | 73 | 66 | 70 | 70 | 68 |
| Flex heat build-up,[4] 55#, 17.5%, 50° C. ΔT, °C | 30 | 43 | 32 | 27 | 37 | 34 |  |  |  |
| Tensile product, X10–[4] |  | 59.1 |  |  | 86.9 |  |  | 42.0 |  |

[1] Zinc di(diethyl)dithiocarbamate.
[2] Zinc di(didecyl)dithiocarbamate.
[3] Zinc di(methyloctadecyl)dithiocarbamate.
[4] Cured 30 minutes at 320° F.

The data shows that the zinc di(didecyl)dithiocarbamate (sample 5) co-vulcanized the EPDM/SBR blend much better than the known diethyl compound (sample 2) of the unsymmetrical methyloctadecyl compound (sample 8). Higher tensile strength and lower flex heat build-up were obtained with the didecyl dithiocarbamate. The symmetrical didecyl compound was superior to the unsymmetrical methyloctadecyl compound even though the total number of carbon atoms in the R radicals were about equal, 20 carbons versus 19 carbons respectively.

The tensile product data substantiates the superiority of the symmetrical compound of this invention. The data shows that the EPDM/SBR blend cured using the didecyl compound, sample 5, had a much stronger cure than the blends using the known diethyl compound, sample 2, or the unsymmetrical methyloctadecyl compound, sample 8.

EXAMPLE III

The EPDM polymer and SBR rubber used in Example II were blended together in various weight ratios and cured using the symmetrical metal dithiocarbamate compounds prepared in Example I. The recipes (in parts by weight) and the data obtained are as follows:

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| EPDM | 100 | 75 | 50 | 25 |  | 100 | 75 | 50 | 25 |  | 75 | 25 | 100 | 75 | 25 |  |
| SBR |  | 25 | 50 | 75 | 100 |  | 25 | 50 | 75 | 100 | 25 | 75 |  | 25 | 75 | 100 |
| N550 | 55 | 55 | 55 | 55 | 55 | 55 | 55 | 55 | 55 | 55 | 55 | 55 | 55 | 55 | 55 | 55 |
| Zinc oxide | 5 | 5 | 5 | 5 | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| $C_8$[1] | 1.5 | 1.5 | 1.5 | 1.5 | 1.5 |  |  |  |  |  |  |  |  |  |  |  |
| $C_{10}$[2] |  |  |  |  |  | 1.3 | 1.3 | 1.3 | 1.3 | 1.3 |  |  |  |  |  |  |
| $C_{12}$[3] |  |  |  |  |  |  |  |  |  |  | 1.5 | 1.5 |  |  |  |  |
| $C_{20}$[4] |  |  |  |  |  |  |  |  |  |  |  |  | 2.75 | 2.75 | 2.75 | 2.75 |
| Cured at 320° F. time, minutes | 25 | 20 | 20 | 20 | 20 | 20 | 20 | 20 | 20 | 20 | 20 | 20 | 20 | 20 | 20 | 20 |
| Tensile, p.s.i. | 2,900 | 2,775 | 2,840 | 2,775 | 2,800 | 2,925 | 2,775 | 2,800 | 2,830 | 2,950 | 2,760 | 2,950 | 2,800 | 2,950 | 3,000 | 2,900 |
| 100% modulus, p.s.i. | 825 | 900 | 750 | 600 | 420 | 1,000 | 840 | 800 | 610 | 400 | 875 | 600 | 850 | 750 | 625 | 500 |
| Elongation, percent | 260 | 290 | 350 | 380 | 430 | 250 | 300 | 310 | 360 | 500 | 270 | 380 | 280 | 320 | 400 | 470 |
| Flex heat build-up,[5] 55#, 17.5%, 50° C. ΔT, °C | 27 | 39 | 38 | 37 | 34 | 27 | 34 | 37 | 36 | 34 |  |  |  |  |  |  |
| Hardness, Durometer A | 69 | 74 | 73 | 69 | 67 | 73 | 73 | 73 | 68 | 66 | 75 | 68 | 71 | 73 | 70 | 68 |

[1] Zinc di(di-2-ethylhexyl)dithiocarbamate.
[2] Zinc di(didecyl)dithiocarbamate.
[3] Zinc di(didodecyl)dithiocarbamate.
[4] Zinc di(dieicosyl)dithiocarbamate.
[5] Cured 30 minutes at 320° F.

The data shows that all of the symmetrical metal dithiocarbonates effectively co-vulcanized the EPDM/SBR blends over the entire range of weight ratios of one polymer to the other. The vulcanized samples have high tensile strength and low flex heat build-up. The properties obtained are comparable to properties one would predict from a consideration of the ratios of the polymers in the blend. This is in stark contrast to the low tensile strength, high flex heat build-up, and unpredictable properties obtained when well-known commercial accelerators are used to cure blends of EPDM polymers with high unsaturation diene rubbers.

EXAMPLE IV

A polymer blend was prepared containing EPDM polymer and SN 600 rubber. The EPDM polymer employed is the same as in Example I. The SN 600 rubber is a polyisoprene rubber having a Mooney viscosity (ML–4 at 212° F.) of about 80. The blend was cured using the symmetrical zinc di(dieicosyl)dithiocarbamate prepared in Example I. As a comparison, a commercial accelerator, zinc di(diethyl)dithiocarbamate was also evaluated. The recipes and the data are as follows:

|  | 1 | 2 | 3 | 4 | 5 | 6 |
|---|---|---|---|---|---|---|
| SN | 100 | 50 | 100 | 75 | 50 | 25 |
| EPDM |  | 50 |  | 25 | 50 | 75 |
| N550 | 55 | 55 | 55 | 55 | 55 | 55 |
| Zinc oxide | 5 | 5 | 5 | 5 | 5 | 5 |
| Stearic acid | 2 | 2 | 2 | 2 | 2 | 2 |
| Sulfur | 1.5 | 1.5 | 1.5 | 1.5 | 1.5 | 1.5 |
| $C_2$ [1] | 0.6 | 0.6 |  |  |  |  |
| $C_{20}$ [2] |  |  | 2.75 | 2.75 | 2.75 | 2.75 |
| Cured 10 minutes at 320° F.: |  |  |  |  |  |  |
| Tensile, p.s.i | 2,150 | 1,750 | 1,825 | 2,150 | 2,375 | 2,750 |
| 100% modulus, p.s.i | 250 | 425 | 200 | 300 | 425 | 560 |
| Elongation, percent | 400 | 330 | 420 | 420 | 430 | 320 |
| Hardness, Durometer A | 52 | 66 | 52 | 59 | 65 | 70 |
| Flex heat build-up,[3] 55#, 17.5%, 50° C. ΔT, ° C | 103 | 124 |  | 90 | 93 | 69 |
| Tensile product, X10⁻⁴ | 86.0 | 57.7 | 76.6 | 90.4 | 100.4 | 88.0 |

[1] Zinc di(diethyl)dithiocarbamate.
[2] Zinc di(dieicosyl)dithiocarbamate.
[3] Cured 30 minutes at 320° F.

The data shows that tensile strength and tensile product decreased and the ΔT value increased when the blend was cured using the known diethyl compound. In contrast, the tensile strength and tensile product increased and the ΔT value decreased when the dieicosyl compound was used as the vulcanization accelerator.

The example was repeated using blends of EPDM polymer with Natural RSS #1 rubber. A comparison of accelerators was made between the diethyl compound and the didecyl compound. The tensile strengths obtained for blends of Natural/EPDM of 75/25 and 50/50 were 2100 p.s.i. and 1800 p.s.i. for the diethyl compound, and 2475 p.s.i. and 1950 p.s.i. for the didecyl compound.

EXAMPLE V

Polymer blends containing EPDM and NBR polymers were cured using the symmetrical metal dithiocarbamates prepared in Example I. The EPDM polymer employed was the same as used in Example II. The NBR rubber was a poly(butadiene-acrylonitrile) rubber having about a 33% by weight acrylonitrile content and a Mooney viscosity of about 55. The acrylonitrile content in the NBR rubbers ranges from about 5% to about 50% by weight based upon the weight of the rubber, the remainder being butadiene. Also included, as a comparison, was an EPDM/NBR blend cured using zinc di(diethyldithiocarbamate), a commercial accelerator. The recipes used and the data obtained are as follows:

|  | 1 | 2 | 3 | 4 | 5 | 6 |
|---|---|---|---|---|---|---|
| EPDM | 100 | 75 | 75 | 75 | 75 | 75 |
| NBR |  | 25 | 25 | 25 | 25 | 25 |
| N550 | 55 | 55 | 55 | 55 | 55 | 55 |
| Zinc oxide | 5 | 5 | 5 | 5 | 5 | 5 |
| Stearic acid | 2 | 2 | 2 | 2 | 2 | 2 |
| Sulfur | 1.5 | 1.5 | 1.5 | 1.5 | 1.5 | 1.5 |
| $C_2$ [1] | 0.6 | 0.6 |  |  |  |  |
| $C_8$ [2] |  |  | 1.15 |  |  |  |
| $C_{10}$ [3] |  |  |  | 1.3 |  |  |
| $C_{12}$ [4] |  |  |  |  | 1.5 |  |
| $C_{30}$ [5] |  |  |  |  |  | 2.75 |
| Cured 20 minutes at 320° F.: |  |  |  |  |  |  |
| Tensile, p.s.i.g | 2,975 | 1,950 | 2,820 | 2,725 | 3,050 | 2,880 |
| 100% modulus, p.s.i.g | 1,075 | 1,060 | 1,200 | 1,250 | 1,175 | 1,050 |
| Elongation, percent | 250 | 300 | 230 | 230 | 230 | 250 |
| Hardness, Durometer A | 77 | 83 | 78 | 78 | 75 | 74 |
| Flex heat build-up,[6] 55#, 17.5%, 50° C., ΔT, ° C | 30 | 56 | 31 | 32 |  |  |
| Percent volume swell ASTM #3 70 hours at 100° C | 137 | 153 | 113 | 111 | 117 | 130 |

[1] Zinc di(diethyl)dithiocarbamate.
[2] Zinc di(di-2-ethylhexyl)dithiocarbamate.
[3] Zinc di(didecyl)dithiocarbamate.
[4] Zinc di(didodecyl)dithiocarbamate.
[5] Zinc di(dieicosyl)dithiocarbamate.
[6] Cured 30 minutes at 320° F.

Sample 2 was cured using the well-known diethyl dithiocarbamate accelerator. The low tensile strength, high flex heat buildup, and high volume swell are indicative of the poor co-vulcanization of the polymers in the blend. The addition of 25% by weight of NBR actually produced a worse vulcanizate than if no NBR was present (compare sample 1 with sample 2). Samples 3 to 6 were cured using the symmetrical metal dithiocarbamates of this invention. A comparison of sample 2 with samples 3–6 shows that a significant improvement in vulcanizate properties was obtained using the symmetrical dithiocarbamates of this invention.

EXAMPLE VI

Polymer blends of EPDM and NBR polymer were prepared at various weight ratios of EPDM to NBR polymer. These blends were then cured using (a) a commercial accelerator, (b) a symmetrical dithiocarbamate of this invention, or (c) an unsymmetrical dithiocarbamate. The EPDM and NBR polymers employed are the same as in Example V. The recipes and data are given in the following table:

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| EPDM | 100 | 75 | 50 | 25 |  | 100 | 75 | 50 | 25 |  | 100 | 75 | 50 | 25 |  |
| NBR |  | 25 | 50 | 75 | 100 |  | 25 | 50 | 75 | 100 |  | 25 | 50 | 75 | 100 |
| N550 | 55 | 55 | 55 | 55 | 55 | 55 | 55 | 55 | 55 | 55 | 55 | 55 | 55 | 55 | 55 |
| Zinc oxide | 5 | 5 | 5 | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| $C_2$ [1] | 0.6 | 0.6 | 0.6 | 0.6 | 0.6 |  |  |  |  |  |  |  |  |  |  |
| $C_{10}$ [2] |  |  |  |  |  | 1.3 | 1.3 | 1.3 | 1.3 | 1.3 |  |  |  |  |  |
| $C_1, C_{18}$ [3] |  |  |  |  |  |  |  |  |  |  | 1.3 | 1.3 | 1.3 | 1.3 | 1.3 |
| Cured 20 minutes at 320° F.: |  |  |  |  |  |  |  |  |  |  |  |  |  |  |  |
| Tensile, p.s.i | 2,975 | 1,950 | 2,090 | 2,540 | 3,375 | 2,925 | 2,725 | 3,190 | 3,250 | 3,060 | 2,700 | 2,350 | 2,150 | 3,000 | 3,100 |
| 100% modulus, p.s.i | 1,075 | 1,060 | 1,200 | 1,200 | 800 | 1,000 | 1,250 | 1,150 | 980 | 825 | 975 | 1,100 | 1,100 | 1,050 | 775 |
| Elongation, percent | 250 | 300 | 180 | 210 | 320 | 250 | 230 | 240 | 300 | 300 | 220 | 200 | 150 | 250 | 340 |
| Hardness, Durometer A | 77 | 83 | 80 | 80 | 76 | 73 | 78 | 76 | 73 | 75 | 70 | 75 | 77 | 76 | 76 |
| Flex heat build-up,[4] 55#, 17.5%, 50° C. ΔT, ° C | 30 | 56 | 52 | 41 | 40 | 27 | 32 | 35 | 38 | 44 |  |  |  |  |  |
| Volume swell, percent 70 hours at 100° C., ASTM #3 oil | 137 | 153 | 105 | 54 | 20 | 157 | 111 | 78 | 50 | 18 | 162 | 122 | 86 | 49 | 17 |
| Tensile product, X10⁻⁴ |  | 58.5 | 37.6 | 53.3 |  |  | 62.7 | 100.8 | 97.5 |  |  | 47.0 | 32.3 | 75.0 |  |

[1] Zinc di(diethyl)dithiocarbamate.
[2] Zinc di(didecyl)dithiocarbamate.
[3] Zinc di(methyloctadecyl)dithiocarbamate.
[4] Cured 30 minutes at 320° F.

Samples 1–5 contain the diethyl compound, samples 6–10 contain the didecyl compound, and samples 11–15 contain the methyloctadecyl compound. The data shows that the highest tensile strength, the highest tensile product, and the most predictable heat buildup and oil swell data were obtained in the blends using the symmetrical didecyl dithiocarbamate compound. This is true even though the total number of carbon atoms in the R radicals of the didecyl and methyloctadecyl compounds are about equal, i.e., 20 to 19. The improvements exist over the entire blend range.

EXAMPLE VII

EPDM/NBR polymer blends were prepared at various weight percent ratios of EPDM polymer to NBR rubber. The NBR rubber used is the same as in Example V. The EPDM polymers employed contained different weight percents of non-conjugated diene termonomer. The compositions of the EPDM polymers were:

| Polymer | Weight percent ethylene | Weight percent propylene | Weight percent ethylidene-norbornene |
|---|---|---|---|
| A | 58 | 33 | 9 |
| B | 58 | 38 | 4 |

The EPDM polymers were blended with NBR rubber and cured using symmetrical dithiocarbamates of this invention. The recipes and data are as follows:

Samples 2 and 3, cured using the novel dithiocarbamates, had significantly higher tensile, tensile product, and elongation than sample 1 cured using the commercial accelerator. The higher tensile and elongation indicates better co-vulcanization of the polymers in the blend.

We claim:

1. A composition comprising (1) from about 1 percent to about 99 percent by weight based upon the total weight of (1) and (2) of an ethylene-higher α-olefin-polyene polymer wherein the higher α-olefin has 3 to about 14 carbon atoms, (2) from about 1 percent to about 99 percent by weight based upon the total weight of (1) and (2) of a highly unsaturated diene rubber, said rubber having an olefinic content from about 20 percent to about 45 percent by weight, (3) from about 0.5 part to about 10 parts by weight based upon 100 parts by weight of (1) and (2) of sulfur, and (4) from about 0.1 part to about 10 parts by weight based upon 100 parts by weight of (1) and (2) of a symmetrical metal dithiocarbamate of the formula

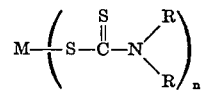

where M is a metal selected from the group consisting of silver, copper, sodium, magnesium, bismuth, zinc, cobalt, nickel, cadmium, lead, iron, selenium, tellurium, and tin, $n$ is the valency of the metal and is from 1 to 4, and R is a hydrocarbon radical containing 6 to about 24 carbon atoms and is selected from the group consisting of alkyl, aralkyl, alkaryl, and cycloalkyl radicals.

2. A composition of Claim 1 wherein (1) is a polymer comprising about 10 percent to about 90 percent by weight of ethylene, about 10 percent to about 80 percent by weight of a higher α-olefin containing 3 to about 6 carbon atoms, and from about 0.5 percent to about 20 percent by weight of a polyene, all weights based upon the weight of the polymer.

3. A composition of Claim 2 wherein in (1) the polyene is a non-conjugated diene present in from about 1 percent to about 10 percent by weight of the polymer, and the ethylene content is from about 20 percent to about 80 percent by weight and the higher α-olefin is from about 19 percent to about 70 percent by weight.

4. A composition of Claim 3 wherein (4) M is selected from the group consisting of zinc, cadmium, and lead, and $n=2$.

5. A composition of Claim 4 wherein (4) R is an alkyl radical containing 8 to about 24 carbon atoms.

6. A composition of Claim 5 wherein (1) the higher α-olefin is selected from the group consisting of propylene and 1-butene, and the non-conjugated diene is an ethylenically unsaturated bridged ring compound containing two double bonds one of which at least is in a ring.

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| EPDM A | 100 | 70 | 30 |  | 100 | 70 | 30 |  |  |  |  |  |  |  |  |  |
| EPDM B |  |  |  |  |  |  |  |  | 100 | 70 | 30 |  | 100 | 70 | 30 |  |
| NBR |  | 30 | 70 | 100 |  | 30 | 70 | 100 |  | 30 | 70 | 100 |  | 30 | 70 | 100 |
| N550 | 50 | 50 | 50 | 50 | 50 | 50 | 50 | 50 | 50 | 50 | 50 | 50 | 50 | 50 | 50 | 50 |
| Zinc oxide | 5 | 5 | 5 | 5 | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| $C_8$ [1] | 1.4 | 1.4 | 1.4 | 1.4 |  |  |  |  | 1.4 | 1.4 | 1.4 | 1.4 |  |  |  |  |
| $C_{20}$ [2] |  |  |  |  | 2.75 | 2.75 | 2.75 | 2.75 |  |  |  |  | 2.75 | 2.75 | 2.75 | 2.75 |
| Cured at 320° F. time, minutes | 27 | 19 | 15 | 11 | 19 | 23 | 18 | 15 | 29 | 13 | 13 | 11 | 23 | 20 | 19 | 15 |
| Tensile, p.s.i. | 2,925 | 2,875 | 3,050 | 3,250 | 2,775 | 2,800 | 2,600 | 3,150 | 2,725 | 2,000 | 2,500 | 3,250 | 2,550 | 2,250 | 2,550 | 3,150 |
| 100% modulus, p.s.i. | 850 | 1,150 | 900 | 550 | 750 | 1,000 | 675 | 590 | 575 | 900 | 875 | 550 | 475 | 800 | 700 | 590 |
| Elongation, percent | 250 | 240 | 310 | 410 | 270 | 230 | 280 | 410 | 340 | 310 | 270 | 410 | 360 | 260 | 330 | 410 |
| Hardness, Durometer A | 72 | 77 | 75 | 70 | 71 | 77 | 74 | 74 | 71 | 78 | 73 | 70 | 70 | 77 | 75 | 74 |
| Volume swell, percent 70 hours at 100° C., ASTM #3 oil | 151 | 115 | 57 | 15 | 161 | 106 | 55 | 21 | 222 | 194 | 77 | 15 | 233 | 173 | 69 | 21 |

[1] Zinc di(di-2-ethylhexyl)dithiocarbamate.
[2] Zinc di(dieicosyl)dithiocarbamate.

EXAMPLE VIII

Terpolymer blends were made using EPDM polymer, SBR rubber, and SN rubber. The EPDM polymer and SBR rubber employed are the same as used in Example II. The SN rubber used is the same as in Example IV. The terblends were cured using a common commercial accelerator, Ethyl Zimate, zinc di(diethyldithiocarbamate) ($C_2$), and two of the novel accelerators of this invention, the zinc di(di-2-ethylhexyldithiocarbamate) ($C_8$) and zinc di(dieicosyldithiocarbamate) ($C_{20}$). The recipes used and data obtained are as follows:

|  | 1 | 2 | 3 |
|---|---|---|---|
| EPDM | 60 | 60 | 60 |
| SBR 1502 | 20 | 20 | 20 |
| SN 600 | 20 | 20 | 20 |
| N550 black | 55 | 55 | 55 |
| Zinc oxide | 5 | 5 | 5 |
| Stearic acid | 2 | 2 | 2 |
| Sulfur | 1.5 | 1.5 | 1.5 |
| $C_2$ | 0.8 |  |  |
| $C_8$ |  | 1.4 |  |
| $C_{20}$ |  |  | 2.75 |
| Cured 15 minutes at 320° F.: |  |  |  |
| Tensile, p.s.i.g | 2,225 | 2,750 | 2,900 |
| 100% modulus, p.s.i.g | 825 | 725 | 750 |
| Elongation, percent | 260 | 330 | 310 |
| Hardness, durometer A | 576 | 73 | 73 |
| Tensile product, X10⁻⁴ | 57.8 | 90.8 | 90.0 |

7. A composition of Claim 6 wherein (1) the higher α-olefin is propylene and the ethylenically unsaturated bridged ring compound is an alkenyl norbornene and wherein (4) M is zinc.

8. A composition of Claim 7 wherein (4) is selected from the group consisting of zinc di(di-2-ethylhexyldithiocarbamate), zinc di(didecyldithiocarbamate), zinc di(didodecyldithiocarbamate), and zinc di(dieicosyldithiocarbamate).

9. A composition of Claim 8 wherein (2) is poly(butadiene-styrene) rubber and (4) is zinc di(didecyldithiocarbamate).

10. A composition of Claim 8 wherein (2) is poly(butadiene-acrylonitrile) rubber and (4) is zinc di(didecyldithiocarbamate).

References Cited
UNITED STATES PATENTS

| | | | |
|---|---|---|---|
| 3,293,197 | 12/1966 | Vincent et al. | 260—894 |
| 3,514,417 | 5/1970 | Bickel et al. | 260—889 |

MURRAY TILLMAN, Primary Examiner

J. ZIEGLER, Assistant Examiner

U.S. Cl. X.R.

260—4, 5, 45.7 S, 45.75 R, 890, 892, 894

UNITED STATES PATENT OFFICE
CERTIFICATE OF CORRECTION

Patent No. 3,830,881    Dated August 20, 1974

Inventor(s) Martin E. Woods and Thomas R. Mass

It is certified that error appears in the above-identified patent and that said Letters Patent are hereby corrected as shown below:

Column 10, in the table at line 22, "$C_{30}{}^5$" should read ---$C_{20}{}^5$---.

Column 11, in the table at line 74, sample 1, "576" should read ---76---.

Signed and sealed this 3rd day of December 1974.

(SEAL)
Attest:

McCOY M. GIBSON JR.
Attesting Officer

C. MARSHALL DANN
Commissioner of Patents